(12) United States Patent
Anderson

(10) Patent No.: US 11,383,571 B2
(45) Date of Patent: Jul. 12, 2022

(54) SHOCK ABSORBERS HAVING INTERNAL JOUNCE CONTROL

(71) Applicant: Ford Global Technologies, LLC, Dearborn, MI (US)

(72) Inventor: Edmund Anderson, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 452 days.

(21) Appl. No.: 15/401,541

(22) Filed: Jan. 9, 2017

(65) Prior Publication Data

US 2018/0194186 A1 Jul. 12, 2018

(51) Int. Cl.
| | |
|---|---|
| *F16F 9/44* | (2006.01) |
| *B60G 15/06* | (2006.01) |
| *F16F 13/06* | (2006.01) |
| *F16F 9/58* | (2006.01) |

(52) U.S. Cl.
CPC ............. *B60G 15/06* (2013.01); *F16F 9/585* (2013.01); *F16F 13/06* (2013.01); *B60G 2202/312* (2013.01); *B60G 2204/4502* (2013.01)

(58) Field of Classification Search
CPC ................ F16F 9/32; F16F 9/364; F16F 9/44
USPC ............................... 188/315, 322.16, 322.18
See application file for complete search history.

(56) References Cited

U.S. PATENT DOCUMENTS

| | | | | |
|---|---|---|---|---|
| 2,546,051 A | * | 3/1951 | Whisler, Jr. ............ | F16F 9/185 188/315 |
| 2,714,942 A | * | 8/1955 | Funkhouser ............ | F16F 9/185 188/315 |
| 2,997,291 A | * | 8/1961 | Stultz ...................... | F16F 9/092 138/26 |
| 3,070,363 A | * | 12/1962 | Ellis, Jr. .................. | F16F 9/003 188/289 |
| 3,181,656 A | | 5/1965 | Damon | |
| 3,344,894 A | * | 10/1967 | Kenworthy ............... | F16F 9/44 137/625.3 |
| 3,722,639 A | * | 3/1973 | Keijzer ................... | F16F 9/003 188/315 |
| 3,731,770 A | * | 5/1973 | Bindon ................... | F16F 9/003 188/285 |
| 4,057,236 A | * | 11/1977 | Hennells ................... | F16F 9/48 188/287 |
| 4,166,523 A | * | 9/1979 | Fujii ....................... | F16F 9/364 188/322.17 |
| 4,262,779 A | * | 4/1981 | Katsumori .............. | F16F 9/062 188/269 |
| 4,284,177 A | * | 8/1981 | Domek .................... | F16F 9/486 188/280 |
| 4,445,598 A | * | 5/1984 | Brambilla ............... | F16F 9/364 188/315 |
| 4,527,674 A | | 7/1985 | Mourray | |

(Continued)

FOREIGN PATENT DOCUMENTS

| | | |
|---|---|---|
| DE | 2937046 | 4/1981 |
| GB | 436845 | 10/1935 |

*Primary Examiner* — Christopher P Schwartz
(74) *Attorney, Agent, or Firm* — Ray Coppiellie; Hanley, Flight & Zimmerman, LLC

(57) ABSTRACT

Shock absorbers having internal jounce control are disclosed. An example shock absorber disclosed herein includes an inner tube defining a cavity and an outer tube surrounding the inner tube to define a reservoir between the inner tube and the outer tube. The cavity is in fluid communication with the reservoir. A jounce bumper is positioned in the reservoir between the inner tube and the outer tube.

20 Claims, 7 Drawing Sheets

(56) References Cited

U.S. PATENT DOCUMENTS

| | | | | |
|---|---|---|---|---|
| 4,527,781 A | * | 7/1985 | Pees | F16F 9/084 188/315 |
| 4,624,346 A | | 11/1986 | Katz | |
| 4,664,234 A | * | 5/1987 | Wight | F16F 9/092 141/11 |
| 4,711,463 A | * | 12/1987 | Knable | B60G 13/001 267/195 |
| 4,724,938 A | * | 2/1988 | Horvath | F16F 9/364 188/322.17 |
| 4,742,898 A | * | 5/1988 | Lee | F16F 9/48 188/287 |
| 4,786,037 A | * | 11/1988 | Mills | B60G 15/061 188/322.14 |
| 5,392,882 A | * | 2/1995 | Mackovjak | B60G 13/18 188/266.2 |
| 6,076,814 A | * | 6/2000 | Grundei | B60G 15/065 188/315 |
| 6,974,002 B2 | * | 12/2005 | Heideman | F16F 9/346 188/285 |
| 7,097,015 B2 | * | 8/2006 | Beck | F16F 9/092 188/315 |
| 7,810,619 B2 | * | 10/2010 | Maeda | F16F 9/58 188/322.17 |
| 8,160,774 B2 | * | 4/2012 | Li | B60G 13/001 188/266 |
| 9,718,322 B2 | * | 8/2017 | Wilkin | B60G 13/08 |
| 2003/0024780 A1 | * | 2/2003 | Yasuda | F16F 9/062 188/322.17 |
| 2005/0067240 A1 | * | 3/2005 | Holiviers | F16F 9/062 188/315 |
| 2008/0314707 A1 | | 12/2008 | Lun | |
| 2009/0283373 A1 | * | 11/2009 | Satou | F16F 9/20 188/319.1 |
| 2016/0201751 A1 | * | 7/2016 | Reybrouck | B60G 13/08 188/298 |

\* cited by examiner

SHOCK ABSORBERS HAVING INTERNAL JOUNCE CONTROL

FIELD OF THE DISCLOSURE

This disclosure relates generally to vehicle shock absorbers and, more particularly, to shock absorbers having internal jounce control.

BACKGROUND

Shock absorbers are used with vehicle suspension systems to dampen undesirable oscillations of the suspension system caused by irregularities of a road surface. A shock absorber may include a damping fluid stored in a cylinder that is forced by a piston (which moves with the functioning of the suspension system) through narrow holes or valves. The resistance encountered as the fluid passes through the holes or valves damps the oscillations of the suspension system. To prevent abrupt bottoming-out of a suspension under full compression, some shock absorbers employ a jounce bumper assembly.

SUMMARY

An example apparatus includes an inner tube defining a cavity and an outer tube surrounding the inner tube to define a reservoir between the inner tube and the outer tube. The cavity is in fluid communication with the reservoir. A jounce bumper is positioned in the reservoir between the inner tube and the outer tube.

An example shock absorber apparatus includes a first tube defining a cavity to receive hydraulic fluid and a second tube coupled to the first tube to define a reservoir in fluid communication with the cavity. A piston is movably coupled to the first tube via a rod extending in the first tube. The piston moves between a first position adjacent a first end of the first tube and a second position adjacent a second end of the first tube opposite the first end along a longitudinal axis of the first tube. A valve controls hydraulic fluid flow between the cavity and the reservoir. A rod guide is coupled to the first end of the first tube. The rod guide guides the rod relative to the longitudinal axis of the first tube when the piston moves between the first position and the second position. A first jounce bumper is positioned in the reservoir adjacent the rod guide. The jounce bumper collapses in a direction substantially parallel relative to the longitudinal axis of the first tube to dampen a force imparted to the shock absorber.

An example method includes providing a twin-tube shock absorber having a pressure tube defining an inner cavity to hold hydraulic fluid and an outer tube defining a reservoir fluidly coupled to the cavity, the reservoir to receive hydraulic fluid during jounce; and inserting a jounce bumper in the reservoir between a rod guide and the hydraulic fluid in the reservoir, the jounce bumper being collapsible in the reservoir.

Figure 1:
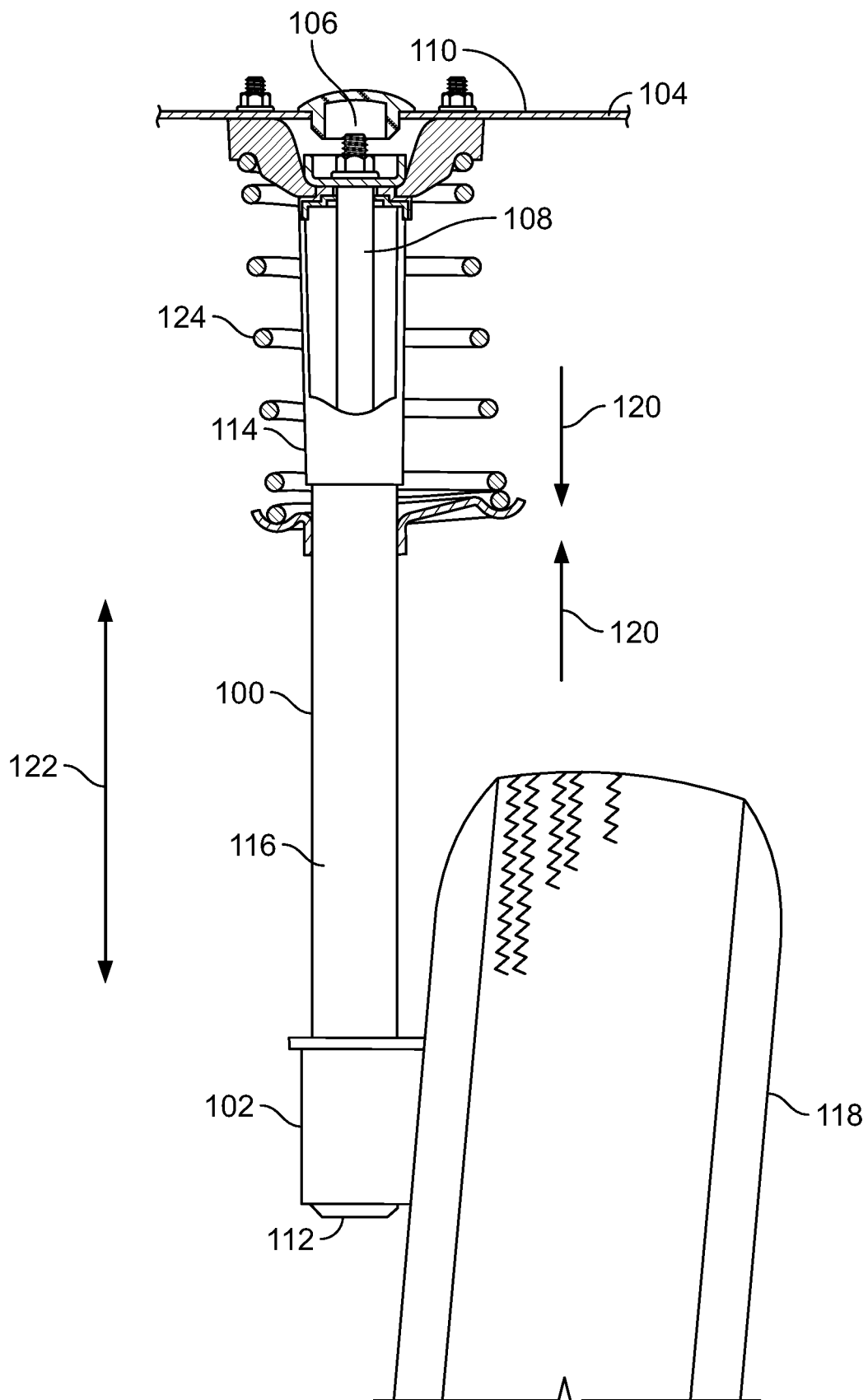
FIG. 1 illustrates an example shock absorber constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Vehicular suspension systems typically include dampers, including shock absorbers and struts in combination with coil springs, to absorb relative displacement between a wheel assembly or vehicle chassis and a vehicle body. In some instances, the vehicle may encounter a road surface anomaly that causes the suspension components to move beyond a desired operating range of the springs and/or dampers (e.g., shock absorbers or struts). To provide an elastic cushion at an end of a travel stroke of the shock absorber under compression (e.g., to limit jounce), the suspension systems typically include a jounce bumper. For example, a jounce bumper typically becomes operable at or near a maximum compressive stroke of the suspension system to prevent a bottoming or provide a limit to further contractive motion.

Jounce bumpers typically include an elastic body coaxially mounted relative to a piston rod. More specifically, jounce bumpers are typically positioned externally of a shock absorber housing between suspension lower control arms and a frame of a vehicle. For example, a jounce bumper may be positioned between a top of the shock absorber (or strut) and a top mount that attaches the shock absorber to the frame of the vehicle. In other words, the jounce bumper is often positioned externally from a shock absorber (e.g., a housing of the shock absorber). External jounce bumpers positioned between a top of a shock absorber and a top mount have a hole that extends the length of the jounce bumper to enable a piston rod (e.g., a shock rod) to slide and/or pass therethrough during operation. To ensure proper alignment of the rod and/or the jounce bumper (e.g., relative to a longitudinal axis of the shock absorber), the opening of the jounce bumper is slightly larger than a diameter of the rod such that the rod (e.g., frictionally) engages (e.g., slides relative to) the jounce bumper to maintain proper alignment of the jounce bumper.

In operation, jounce bumpers absorb impact forces and/or dampen noise or vibration by preventing articulated suspension components from fully compacting during shock impacts caused by heavy loads, potholes, curbs or objects in the road. As a piston moves within a shock absorber housing to dissipate or reduce forces, the piston rod slides through the opening formed by the jounce bumper. In some instances, the rod engages or rubs against an inner surface of the jounce bumper, thereby creating undesired noise (e.g., a squeaking noise). Such noise may be unpleasant for the vehicle operator. In some instances, the jounce bumper may damage an outer surface of the piston rod when the piston rod moves relative to the jounce bumper (e.g., and the jounce bumper collapses around piston rod). In some such instances for example, the jounce bumper may scuff, scratch, and/or otherwise remove material from the outer surface of the piston rod, which may cause hydraulic oil to leak from a shock absorber housing to the environment and affect the operation of the shock absorber. In some examples, the jounce bumper is often formed from a urethane material (e.g., a micro cellular urethane material), which is more expensive than other elastomeric material(s) and can be difficult and/or expensive to manufacture. Additionally, over time, an externally located jounce bumper can become damaged (e.g., cut or torn).

Example shock absorbers disclosed herein employ an internal jounce control apparatus (e.g., a jounce bumper) to control jounce. More specifically, example jounce control apparatus disclosed herein provide an energy sink in a jounce load path. Example internal jounce control apparatus disclosed herein include a collapsible element (e.g., an elastomeric body). For example, the collapsible body may be composed of urethanes or rubber material(s). Specifically, the collapsible element disclosed herein may be positioned within a housing of a shock absorber (e.g., a shock absorber or strut). For example, the collapsible element may be positioned in a fluid reservoir of a shock absorber housing. In some examples, the collapsible element may be an elastomeric ring or a cylindrical body. The collapsible element disclosed herein may be tunable to adjust or control forces (e.g., reactive forces) at the limit end of the jounce stroke. For example, example collapsible element disclosed herein may be tunable by modifying geometric aspects and/or material(s) of the collapsible element. Example collapsible elements disclosed herein may be tuned by modifying a shape, thickness, material properties and/or hardness characteristic(s) of the collapsible element. In some examples, example jounce control apparatus disclosed herein may be used in place of external jounce control apparatus. In some examples, example shock absorbers disclosed herein employ a dual jounce control system to improve jounce control. For example, jounce control apparatus disclosed herein may be used in conjunction with an external jounce control apparatus to provide a dual damping rate system in the jounce load path. For example, the jounce control apparatus disclosed herein may provide an additional energy sink when used with an external jounce control apparatus.

FIG. 1 illustrates an example shock absorber 100 constructed in accordance with the teachings of this disclosure. The shock absorber 100 of the illustrated example may be used with a suspension 102 of a vehicle 104 (e.g., an automobile). For example, a first end 106 of a piston rod 108 of the shock absorber 100 may be coupled to a frame 110 of the vehicle 104 and a second end 112 of the shock absorber 100 opposite the first end 106 may be coupled (e.g., attached) to the suspension 102 (e.g., a suspension control link, a vehicle chassis) of the vehicle 104. To house or protect the piston rod 108 (e.g., from water, dirt and/or other contaminants), the shock absorber 100 of the illustrated example includes a cover 114 (e.g., a dust cover) slidably coupled relative to a housing 116 of the shock absorber 100.

During normal driving conditions, the shock absorber 100 of the illustrated example controls unwanted motion of the vehicle 104 by reducing a magnitude of vibratory motion. For example, the shock absorber 100 of the illustrated example gradually dissipates forces generated when a wheel 118 of the vehicle 104 associated with the shock absorber 100 traverses a bump, pothole, and/or other road surface anomalies in a controlled manner that helps a driver maintain control over the vehicle 104 and/or provides the driver a comfortable driving environment.

When the vehicle traverses a road surface anomaly, displacement of the suspension 102 causes displacements of the shock absorber 100, causing the shock absorber 100 of the illustrated example to move between a compression cycle 120 and a rebound cycle 122 (e.g., an extension cycle). During the compression cycle 120, the frame 110 and/or the wheel 118 move towards each other to cause compression of a spring 124 of the suspension 102 and cause the housing 116 of the shock absorber 100 to move toward the frame 110 of the vehicle 104 (e.g., toward the first end 106) relative to the cover 114 and/or the piston rod 108. During the rebound cycle 122, the frame 110 and/or the wheel 118 move away from each other, thereby releasing tension from the spring 124. Additionally, the housing 116 of the shock absorber 100 moves away from the frame 110 (e.g., away from the first end 106) relative to the piston rod 108 and/or the cover 114. For example, when the vehicle 104 traverses a bump (e.g., at high speeds on the road), the wheel 118 deflects over the bump allowing the shock absorber 100 to absorb the impact, thereby reducing the motion of the vehicle 104 via the spring 124 and not disturbing the comfort of the driver and/or passenger(s) of the vehicle. The compression cycle 120 controls the motion of an unsprung weight of the vehicle (e.g., a weight of the vehicle below the frame 110), while the rebound cycle 122 controls a (e.g., heavier) sprung weight of the vehicle (e.g., the weight of the vehicle above the frame 110).

Figure 2:
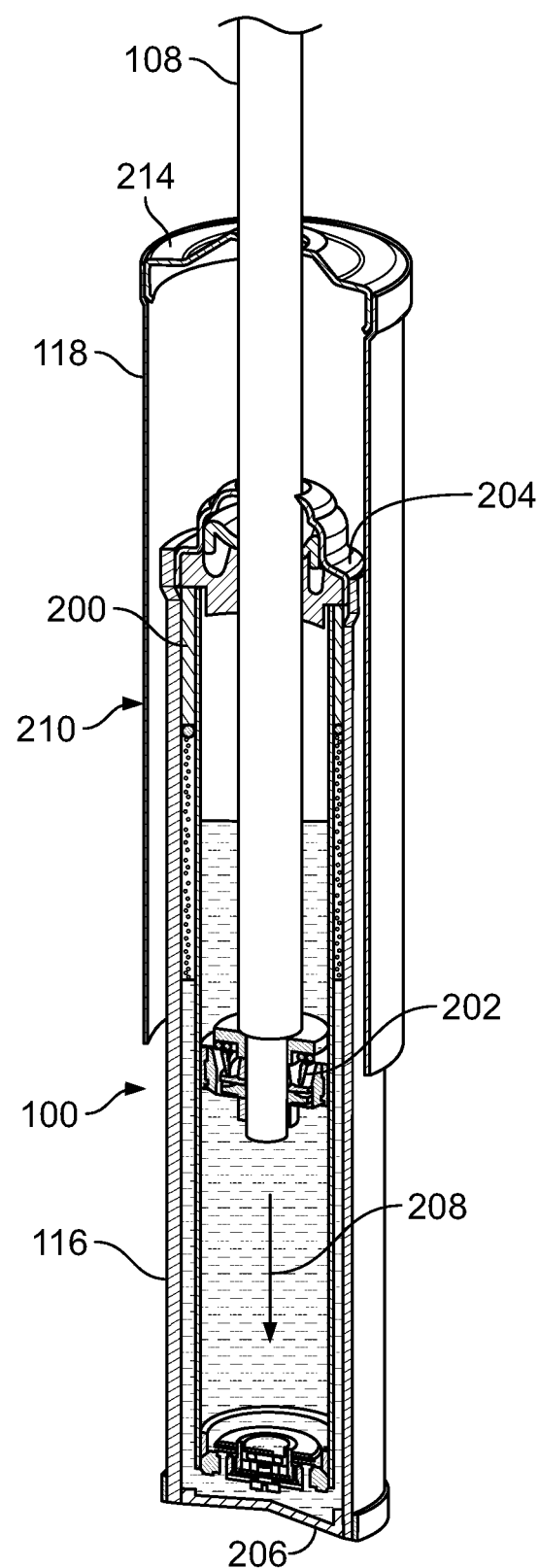
FIG. 2 is a perspective, cutaway view of the example shock absorber of FIG. 1.

FIG. 2 is a perspective, cut-away view of the example shock absorber 100 of FIG. 1. The shock absorber 100 of the illustrated example includes a piston 202 positioned in the housing 116 and coupled (e.g., directly attached) to the piston rod 108. The piston 202 of the illustrated example moves relative to the housing 116 between a first position adjacent a first end 204 of the housing 116 and a second position adjacent a second end 206 of the housing 116. The compression cycle 120 (FIG. 1) of the example shock absorber 100 includes a desired operating range between an initial stroke position of the piston 202 adjacent the first end 204 of the housing 116 and a limit stroke position (e.g., a maximum stroke position) adjacent the second end 206 of the housing 116, which is less than a full compression stroke position (e.g., a maximum compression stroke) of the shock absorber 100. In certain instances, during high energy impact (e.g., when the vehicle 104 traverses potholes or bumps), a stroke position of the piston 202 may extend beyond the limit stroke position in a compression direction 208 during the compression cycle 120. For example, in certain instances, the vehicle 104 may encounter a road surface anomaly that causes components of the suspension 102 of the vehicle 104 to contract beyond a desired operating range of the spring 124 and/or the shock absorber 100.

To protect the shock absorber 100 and/or the frame 110 (e.g., a vehicle body) from the extreme jounce forces associated with severe irregularities in the road surface, the shock absorber 100 of the illustrated example employs a jounce control apparatus 210. For example, the jounce control apparatus 210 of the illustrated example prevents an abrupt bottoming-out of the suspension 102 and/or the shock absorber 100 under full compression. Thus, the jounce control apparatus 210 of the illustrated example provides an energy sink that absorbs and/or dissipates forces to reduce peak forces (e.g., peak vertical loads) experienced by the vehicle 104 during an impact event when the shock absorber 100 moves to a fully compressed state.

The jounce control apparatus 210 of the illustrated example includes a jounce bumper 212. More specifically, the jounce bumper 212 is positioned (e.g., encased) inside the housing 116 of the shock absorber 100. The jounce bumper 212 of the illustrated example provides an end of stroke cushion for the shock absorber 100 when the shock absorber 100 moves in the compression direction 208. In particular, the jounce bumper 212 of the illustrated example compresses or collapses to manage forces at a limit of suspension travel when the shock absorber 100 moves in the compression direction 208. Additionally, the jounce bumper 212 of the illustrated example reduce noise and/or vibration. In some examples, the jounce bumper 212 of the illustrated example eliminates the need for jounce bumpers positioned externally relative to (e.g., the housing 116 of) the shock absorber 100 between the first end 204 of the housing 116 and an end 214 of the cover 114. However, in some examples, external jounce bumpers may be provided in addition to the internal jounce bumper 212 as shown, for example, in FIG. 8. In some such examples, the internal jounce bumper 212 contributes to performance characteristic(s) of a jounce control system, thus enabling an external jounce bumper to be composed of a cost-reduced material(s). For example, because the internal jounce bumper 212 absorbs some of the energy during jounce, performance characteristic(s) of an external jounce bumper may be reduced. Such reduction in performance characteristic(s) of an external jounce bumper enables use of a lower-cost external jounce bumper.

Figure 3:
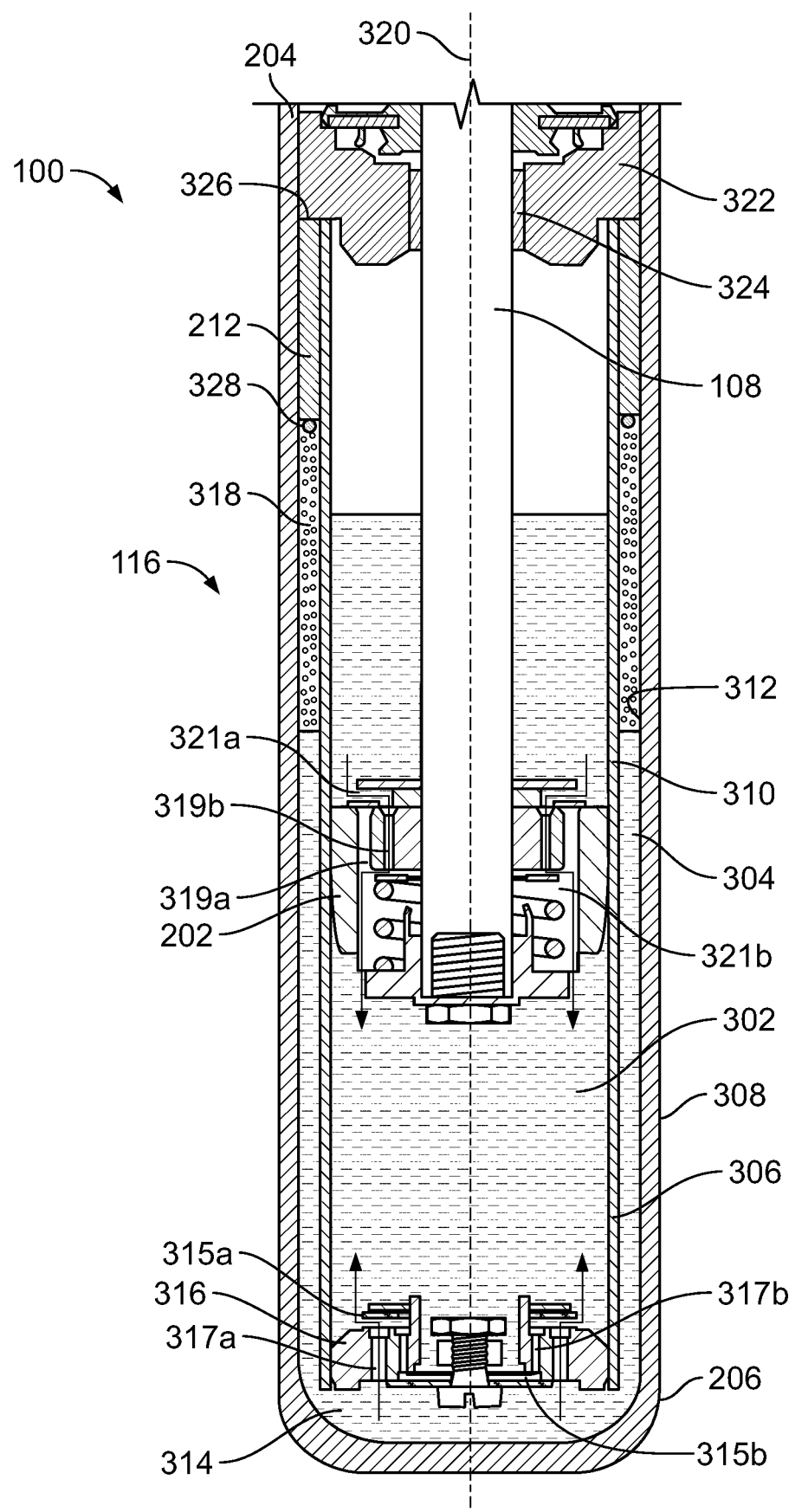
FIG. 3 is a cross-sectional view of the example shock absorber of FIG. 1.

FIG. 3 is a cross-sectional view of the example shock absorber 100 of FIGS. 1 and 2. The housing 116 of the shock absorber 100 of the illustrated example defines a cavity 302 and a reservoir 304. More specifically, the housing 116 of the illustrated example includes a first tube 306 (e.g., an inner tube or pressure cylinder) nested with a second tube 308 (e.g., an outer tube or a reserve tube). In other words, the first tube 306 of the illustrated example is coaxially aligned with the second tube 308. The first tube 306 of the illustrated example defines the cavity 302. The second tube 308 surrounds the first tube 306 to define the reservoir 304 between the first tube 306 and the second tube 308. More specifically, the reservoir 304 of the illustrated example is formed between an outer surface 310 of the first tube 306 and an inner surface 312 of the second tube 308.

Figure 6:
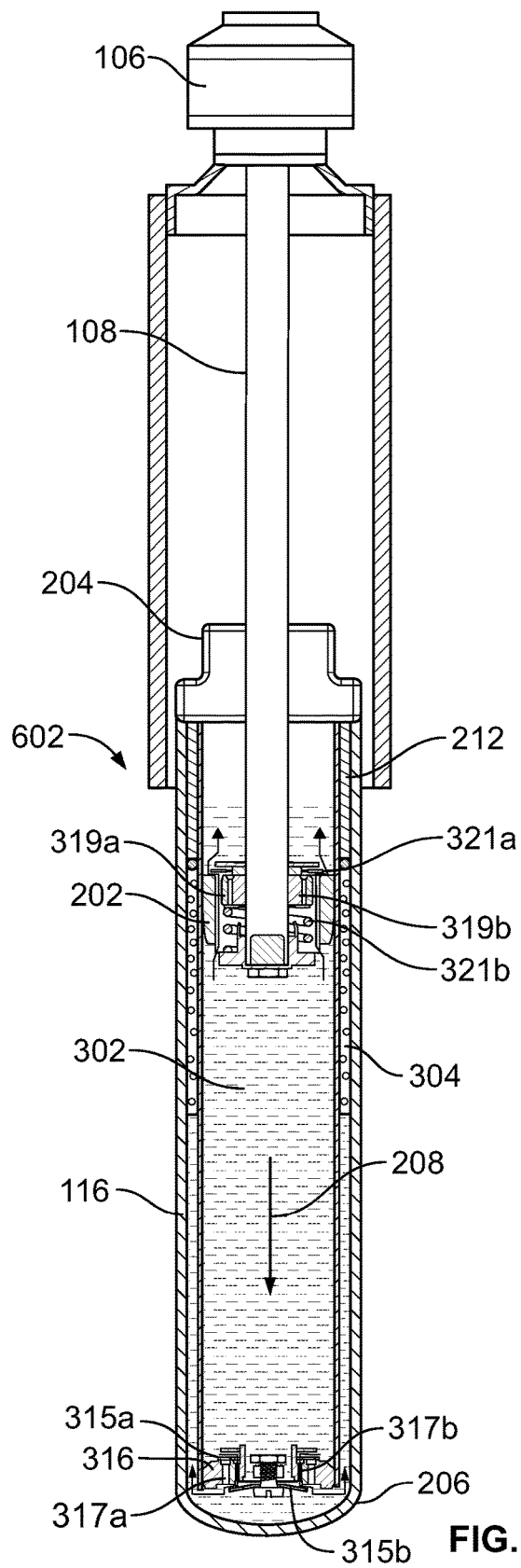
FIG. 6 illustrates the example shock absorber of FIGS. 1-5 shown in a first position.
Figure 7:
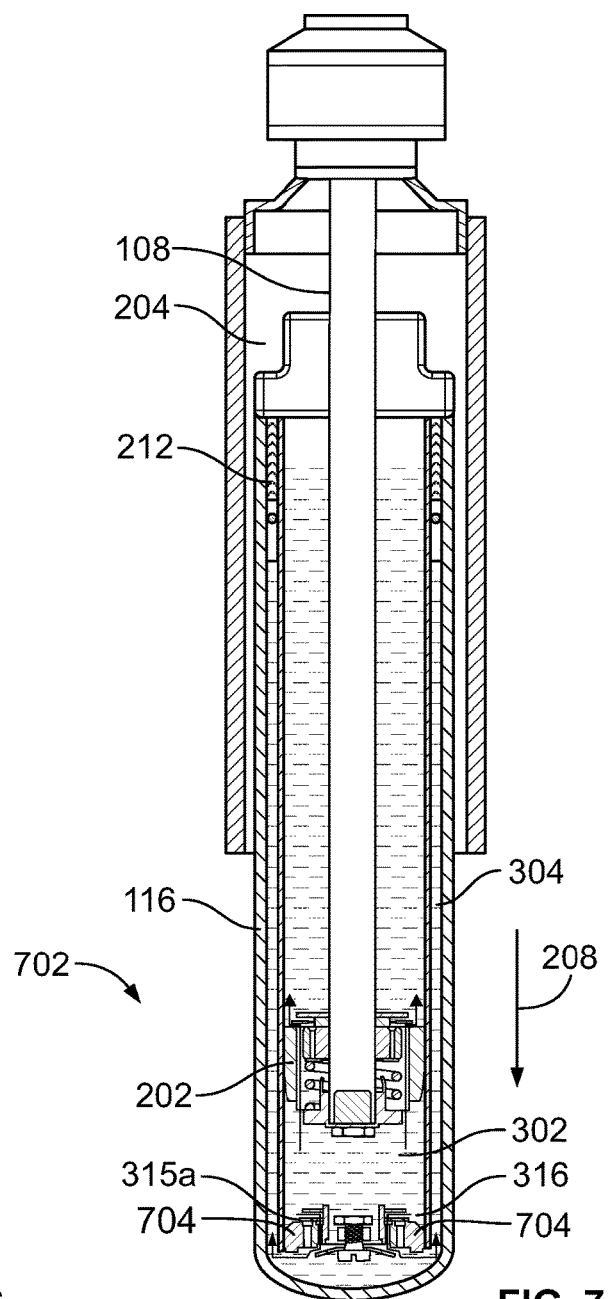
FIG. 7 illustrates the example shock absorber of FIGS. 1-5 shown in a second position.

The cavity 302 of the illustrated example receives a damping fluid (e.g., hydraulic fluid) to absorb and/or dissipate energy during the compression cycle 120 and the rebound cycle 122. To store the damping fluid in the reservoir 304, the cavity 302 of the illustrated example is in fluid communication (e.g., fluidly coupled to) the reservoir 304. The reservoir 304 of the illustrated example is in fluid communication with (e.g., fluidly coupled to) the cavity 302 via a channel or passageway 314. To control (e.g., modulate) flow of the damping fluid between the cavity 302 and the reservoir 304, the shock absorber 100 of the illustrated example includes a valve 316. The valve 316 of the illustrated example is positioned adjacent the second end 206 (e.g., at a bottom) of the housing 116. The valve 316 of the illustrated example includes a first disk 315a and a second disk 315b that move relative to respective orifices 317a and 317b to control the flow of damping fluid moving between the cavity 302 and the reservoir 304 via the passageway 314 as the piston 202 moves relative to the housing 116. For example, the first disk 315a of the illustrated example moves away from the orifice 317a and the second disk 315b seals the orifice 317b to allow fluid flow from the reservoir 304 to the cavity 302 during the rebound cycle 122 (e.g., as shown in FIG. 3). For example, the first disk 315a of the illustrated example seals the orifice 317a and the second disk 315b moves away from the orifice 317b to allow fluid flow from the cavity 302 to the reservoir 304 during the compression cycle 120 (e.g., as shown in FIGS. 6 and 7). Additionally, to reduce or prevent the damping fluid from foaming or aerating due to overheating, the reservoir 304 of the illustrated example includes a pressurized gas 318 (e.g., a low-pressure charge of nitrogen gas).

To absorb and/or dissipate energy and to control unwanted motion of the vehicle 104, the piston 202 moves through the damping fluid in the cavity 302 between the first end 204 of the housing 116 and the second end 206 of the housing 116 along a longitudinal axis 320 during the compression cycle 120 and the rebound cycle 122. As shown in the illustrated example of FIG. 3, the rebound cycle 122 occurs as the piston 202 moves toward the first end 204 of the housing 116, compressing the damping fluid in the cavity 302 above the piston 202. The compression cycle 120 occurs as the piston 202 moves downward toward the second end 206 of the housing 116, compressing the damping fluid in the cavity 302 below the piston 202 (e.g., below the piston 202 and the valve 316). When the wheel 118 moves relative to the frame 110 of the vehicle 104, the piston 202 moves relative to the housing 116 to dissipate unwanted vibratory motions. The shock absorber 100 controls unwanted motion of the vehicle 104 by turning the kinetic energy of suspension movement into heat energy that can be dissipated through damping fluid. For example, when the wheel 118 encounters a bump in the road and causes the spring 124 to coil and uncoil, the energy of the spring 124 is transferred to the shock absorber 100 through an upper mount coupled to the first end 106 if the piston rod 108, down through the piston rod 108 and to the piston 202.

To allow the damping fluid to flow through the piston 202 as the piston 202 moves up and down in the cavity 302, the piston 202 includes bleed passages or orifices 319a and 319b. Because the orifices 604 are relatively small, only a small amount of fluid, under great pressure, passes through generating heat as the energy in the fluid is dissipated via friction between the fluid and the orifices 604. This damps movement of the piston 202, which in turn damps movement of the spring 124. To control damping fluid flow through the piston 202, the piston 202 of the illustrated example includes a first disk 321a and a second disk 321b. The first disk 321a moves relative to the orifice 319a and the second disk 321b moves relative to the orifice 319b. For example, the first disk 321a seals the orifice 319a and the second disk 321b moves away from the orifice 319b to allow fluid flow from a chamber above the piston 202 to a chamber below the piston 202 via the orifice 319b during the rebound cycle 122 (e.g., as shown in FIG. 3). The first disk 321a moves away from the orifice 319a and the second disk 321b seals the orifice 319b to allow fluid flow from a chamber below the piston 202 to a chamber above the piston 202 via the orifice 319a during the compression cycle 120 (e.g., as shown in FIGS. 6 and 7 below).

To move the piston 202 relative to the housing 116 along the longitudinal axis 320, the shock absorber 100 of the illustrated example includes the piston rod 108. The piston rod 108 of the illustrated example is slidably coupled to housing 116 and extends from the first end 204 of the housing 116. To guide the piston rod 108 relative to the longitudinal axis 320, the housing 116 of the illustrated example includes a rod guide 322 (e.g., cap). The rod guide 322 of the illustrated example includes an aperture 324 to slidably receive the piston rod 108. The rod guide 322 provides a cover coupled to the housing 116 (e.g., via welding) that seals the cavity 302 and the reservoir 304 and prevents the damping fluid from leaking to the environment via the first end 204 of the housing 116 and/or along the piston rod 108.

The jounce bumper 212 of the illustrated example is positioned or located inside the reservoir 304 of the housing 116. More specifically, the jounce bumper 212 is positioned adjacent the rod guide 322. In particular, the jounce bumper 212 of the illustrated example includes a first end 326 positioned adjacent the rod guide 322 and a second end 328 opposite the first end 326 positioned adjacent the damping fluid and/or the gas 318 in the reservoir 304. As shown in the illustrated example, the second end 328 of the jounce bumper 212 is positioned in fluid communication with the gas 318.

Figure 4:
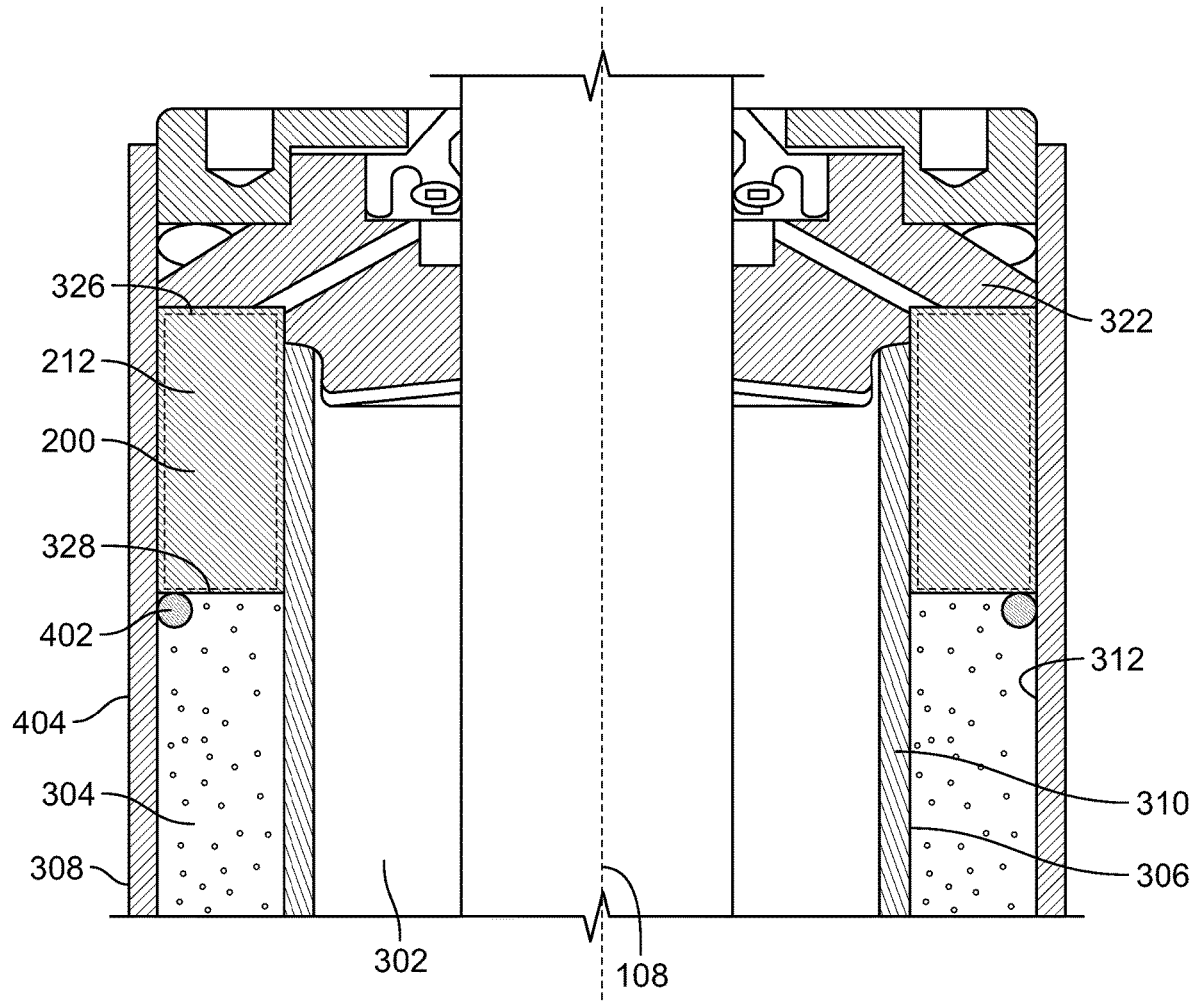
FIG. 4 is an enlarged, partial view of the example shock absorber of FIGS. 1-3

FIG. 4 is an enlarged portion of the example shock absorber 100 of FIGS. 1-3. Referring to FIG. 4, the jounce bumper 212 of the illustrated example is retained in the reservoir 304 via friction (e.g., via a friction fit). For example, the jounce bumper 212 of the illustrated example may be retained in the reservoir 304 via a friction fit provided by the outer surface 310 of the first tube 306 and the inner surface 312 of the second tube 308. In addition, or as an alternative to the friction fit, the jounce bumper 212 of the illustrated example is retained in the reservoir 304 via a shoulder or protrusion 402 (e.g., a shoulder or other retainer). The protrusion 402 of the illustrated example extends from the inner surface 312 of the second tube 308 toward the outer surface 310 of the first tube 306 in a direction substantially perpendicular relative to the longitudinal axis 320. Thus, the jounce bumper 212 of the illustrated example is positioned (e.g., captured) between the rod guide 322 and the protrusion 402. For example, the first end 326 of the jounce bumper 212 engages the rod guide 322 and the second end 328 of the jounce bumper 212 engages the protrusion 402. In some examples, a protrusion may be formed on the outer surface 310 of the first tube 306.

In some examples, the protrusion 402 of the illustrated example may be formed as an annular rib. In some examples, the protrusion 402 of the illustrated example may be formed via one or more indentations provided in an outer surface 404 of the second tube 308. For example, the one or more indentations or deformations may be formed on the outer surface 404 of the second tube 308 to provide one or more respective protrusions projecting from the inner surface 312 of the second tube 308 and toward the outer surface 310 of the first tube 306. For examples, the indentations may be spaced intermittently about a circumference of the second tube 308. In some examples, the indentations may be formed via a tool (e.g., a crimping tool) after the jounce bumper 212 is positioned in the reservoir 304. For example, a crimping tool may be employed to form a ridge (e.g., a circumferential ridge) in the second tube 308. For example, the crimping tool may form an indentation in an outer surface of the second tube 308, which forms the protrusion 402 (e.g., the ridge) on the inner surface of the second tube 308. In some examples, the (e.g., inner surface) second tube 308 may be formed with a groove that receives a snap ring to form the protrusion 402 on the inner surface of the second tube 308. In some examples, the first end 326 of the jounce bumper 212 may be attached or coupled (e.g., via mechanical fasteners, chemical fasteners, etc.) to the rod guide 322 to retain (e.g., a position of) the jounce bumper 212 in the reservoir 304.

Figure 5:
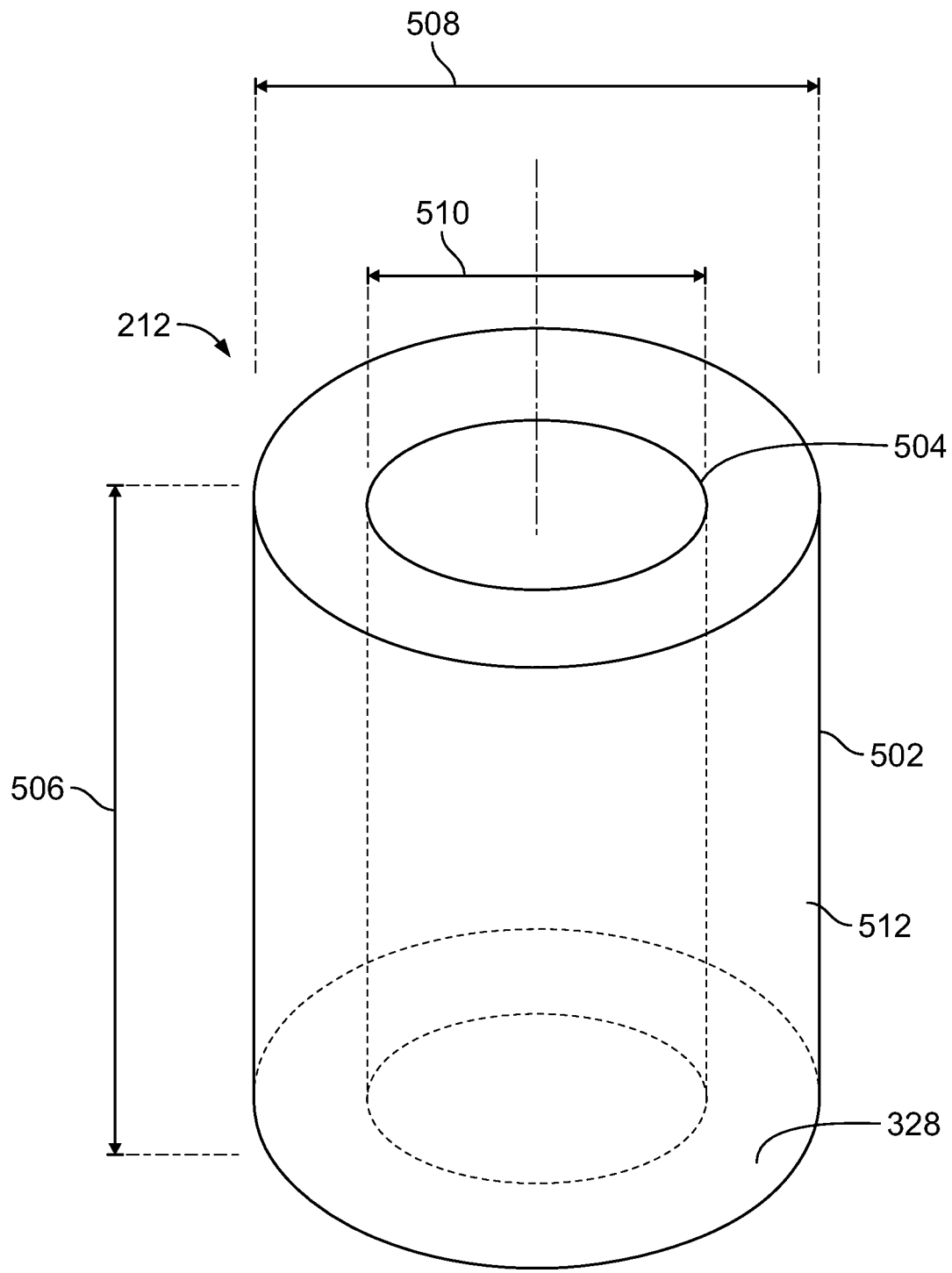
FIG. 5 is a perspective view of an example jounce bumper of the example shock absorber of FIGS. 1-4.

FIG. 5 is a perspective view of the example jounce bumper 212 of FIGS. 1-4. The jounce bumper 212 of the illustrated example is a cylindrical body 502 having an aperture 504 to receive (e.g., frictionally receive) the first tube 306 (FIG. 3). The jounce bumper 212 of the illustrated example is composed of an elastomeric material. For example, the jounce bumper 212 of the illustrated example may be composed of a urethane material (e.g., a micro cellular urethane material), rubber, or any other suitable elastomeric material that can dissipate peak vertical loads. The jounce bumper 212 of the illustrated example has a length 506, an outer diameter 508 and an inner diameter 510. The outer diameter 508 of the illustrated example is slightly smaller (e.g., almost identical) relative to an inner diameter of the second tube 308 and the inner diameter 510 is slightly larger (e.g., almost identical) relative to an outer diameter of the first tube 306 so that the jounce bumper 212 frictionally engages the first tube 306 and/or the second tube 308. In some examples, the outer diameter 508 of the illustrated example is significantly smaller than an inner diameter of the second tube 308 and the inner diameter 510 is significantly larger than the outer diameter of the first tube 306 such that the jounce bumper 212 does not frictionally engage the first tube 306 and/or the second tube 308. In some such examples, the protrusion 402 maintains the position of the jounce bumper 212 in the reservoir 304.

Performance characteristic(s) of the jounce bumper 212 (e.g., an amount of distance that the jounce bumper 212 can deform, energy absorption capabilities, etc.) may be tuned by modifying the dimensions and/or shape of the jounce bumper 212 and/or a material and/or a hardness characteristic(s) of the jounce bumper 212. For example, material selection of the jounce bumper 212 may provide different absorption rates. In some examples, the length 506, the outer diameter 508, a density and/or the shape of the jounce bumper 212 may be altered to adjust (e.g., increase or decrease) performance (e.g., energy absorption) capability of the jounce bumper 212. In some examples, a surface area or face of the second end 328 of the jounce bumper 212 may be configured to tune the performance of the jounce bumper 212. For example, the face at the second end 328 of the jounce bumper 212 may include one or more cavities or protrusions. In some examples, a side wall 512 of the jounce bumper 212 may have a bellows profile along at least a portion of the length 506 (e.g., see external jounce bumper 802 of FIG. 8). In some examples, an amount (e.g., a volume) of gas 318 in the reservoir 304 may be adjusted (e.g., increased or decreased) to adjust the amount of energy absorption of the shock absorber 100.

FIG. 6 illustrates the shock absorber 100 of the illustrated example in a first compression stroke position 602 (e.g., an initial compression stroke position). When the wheel 118 moves toward to the frame 110 of the vehicle 104 (e.g., the compression cycle 120), the piston 202 moves relative to the housing 116, converting the shock energy into heat via the damping fluid.

FIG. 7 illustrates the shock absorber 100 of the illustrated example in a second compression stroke position 702 (e.g., a maximum compression stroke position). In particular, when the wheel 118 moves upward relative to the frame 110, the piston rod 108 of the illustrated example moves the piston 202 relative to the housing 116 from the first compression stroke position 602 to the second compression stroke position 702. As piston 202 moves relative to the housing 116 during the compression cycle 120, the second disk 321b blocks fluid flow through the orifice 319b and the first disk 321a moves away from the orifice 319a to allow the damping fluid move through the piston 202 (e.g., based on a pressure differential across the piston 202) via the orifice 319a. Similarly, the change in pressure between a chamber above the piston 202 and a chamber below the piston 202 causes the first disk 315a of the valve 316 to seal the orifice 317a and allow the disk 315b to move away from the orifice 317b to allow damping fluid to flow from the cavity 302 to the reservoir 304. Thus, during the compression cycle 120, the piston 202 moves toward the valve 316 and the damping fluid in the cavity 302 below the piston 202 is transferred to the reservoir 304 via the valve 316, thereby increasing a volume and/or a pressure in the reservoir 304.

In turn, the jounce bumper 212 reacts and/or absorbs the increased force and/or pressure in the reservoir 304 to slow or reduce (e.g., cushion) an impact force as the piston 202 moves toward a fully compressed stroke position (e.g., toward the valve 316). For example, the jounce bumper 212 of the illustrated example compresses or collapses to manage forces at a limit of suspension travel when the piston 202 moves in the compression direction 208. For example, the jounce bumper 212 of the illustrated example compresses or collapses in a direction parallel to the longitudinal axis 320 and in a direction toward the rod guide 322. For example, the jounce bumper 212 compresses or collapses in a direction substantially parallel (e.g., zero degrees plus or minus 10% or non-perpendicular) relative to the longitudinal axis 320 to manage forces in the compression direction. An absorption characteristic or performance of the jounce bumper 212 restricts or hinders the piston 202 from moving past a maximum compression stroke position in the compression direction 208. For example, the jounce bumper 212 of the illustrated example may be a supplemental energy device that improves energy absorption. For example, the jounce bumper 212 of the illustrated example dissipates energy to provide or enable a more gradual rate build up by reducing an abruptness of the compression of the shock absorber 100. Thus, the jounce bumper 212 provides an energy sink in a jounce bumper load path under medium to high energy impact loading such as, for example, potholes and bumps. The jounce bumper 212 of the illustrated example improves an overall energy management of a suspension system while maintaining desired ride and handling performance characteristic(s).

Figure 8:
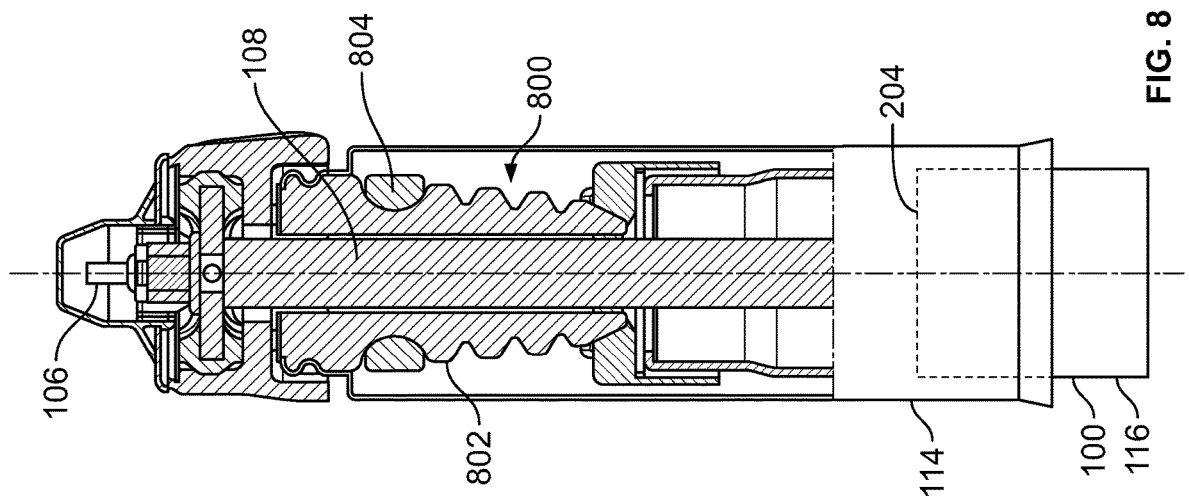
FIG. 8 illustrates the example shock absorber of FIGS. 1-5 implemented with an external jounce bumper.

FIG. 8 illustrates the example shock absorber 100 of FIGS. 1-7 implemented with a jounce bumper assembly 800. The jounce bumper assembly 800 includes an external jounce bumper 802 positioned between the first end 106 of the piston rod 108 (e.g., a top mount) and the first end 204 of the housing 116. The external jounce bumper 802 of the illustrated example includes a rate ring 804. However, in some examples, the external jounce bumper 802 may not include the rate ring 804. The external jounce bumper 802 of the illustrated example is protected by the cover 114.

The example shock absorber 100 of the illustrated example includes both the jounce bumper 212 and the external jounce bumper 802. The external jounce bumper 802 of the illustrated example provides jounce control in combination with the jounce control provided by the jounce bumper 212. In some examples, the external jounce bumper 802 may be composed of a urethane material. In some examples, the external jounce bumper 802 of the illustrated example may be composed of an elastomeric material (e.g., a non-micro cellular urethane material, a rubber material, etc.) that may cost less than an external jounce bumper composed of a urethane material (e.g., a micro cellular urethane material). The jounce bumper 212 and the external jounce bumper 802 provide dual jounce control (e.g., dual energy sinks) to absorb impact loads. In some examples, the external jounce bumper 802 supplements the jounce bumper 212 to improve an overall energy management system while maintaining desired ride and handling performance and limits suspension travel.

Figure 9:
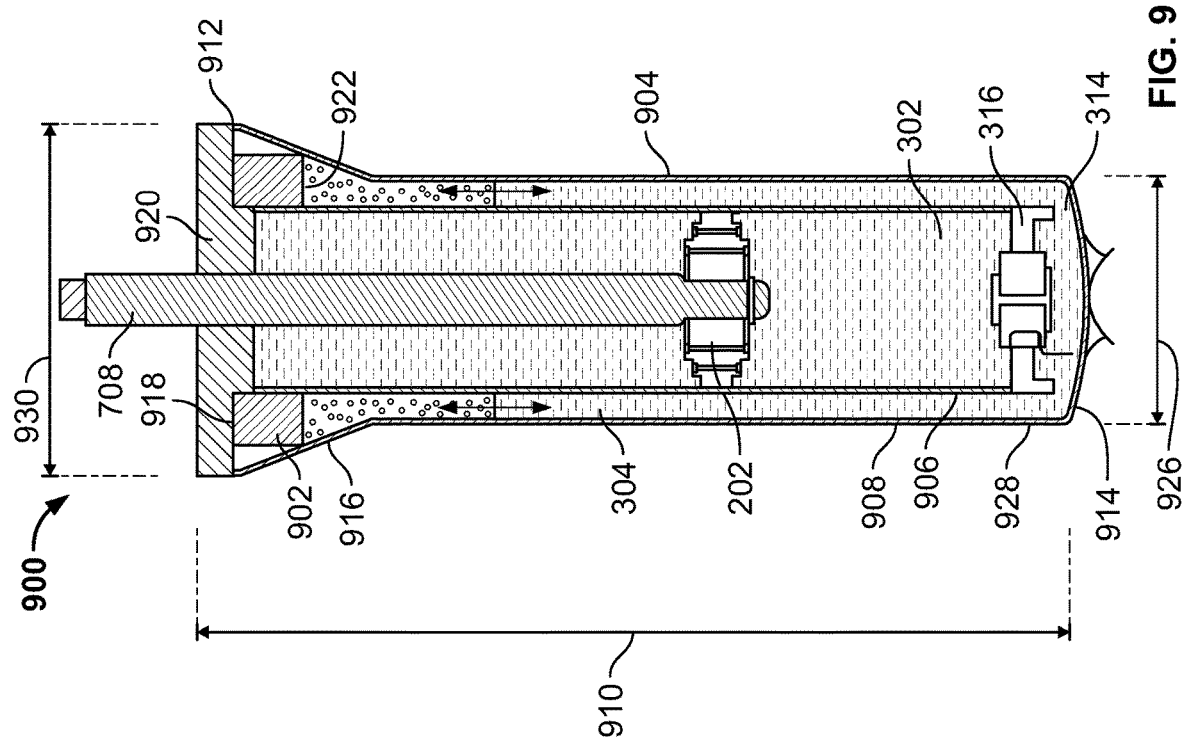
FIG. 9 illustrated another example shock absorber disclosed herein.

FIG. 9 illustrates another example shock absorber 900 disclosed herein. Those components of the example shock absorber 900 of FIG. 9 that are substantially similar or identical to the components of the example shock absorber 100 of FIGS. 1-8 described above and that have functions substantially similar or identical to the functions of those components will not be described in detail again below. Instead, the interested reader is referred to the above corresponding descriptions. To facilitate this process, similar reference numbers will be used for like structures.

The shock absorber 900 of the illustrated example includes jounce control to absorb impact loads when the piston 202 moves in the compression direction 208. The jounce control 200 of the illustrated example includes a jounce bumper 902 positioned in a housing 904 defined by a first tube or inner tube 906 and a second tube or outer tube 908. The inner tube 906 defines a cavity 302 to receive the piston 202 and a damping fluid. The outer tube 908 is coaxially aligned with and surrounds the inner tube 906 to define a reservoir 304 and is fluidly coupled to the cavity 302 via the valve 316 and a passageway 314. The outer tube 908 of the illustrated example has a length 910 between a first end 912 of the outer tube 908 and a second end 914 of the outer tube 908. The outer tube 908 of the illustrated example includes a tapered portion 916 (e.g., a tapered or angled surface) positioned along a portion of the length 910. The tapered portion 916 of the illustrated example increases a volume of the reservoir 304 compared to, for example, an outer tube without the tapered portion 916 (e.g., the second tube 308 of FIGS. 1-8). The jounce bumper 902 of the illustrated example is positioned in the reservoir 304. More specifically, the jounce bumper 902 of the illustrated example has a first end 918 positioned adjacent a rod guide 920 and a second end 922 positioned adjacent the tapered portion 916. In the illustrated example, the tapered portion 916 forms a seat to retain the jounce bumper 902 in the reservoir 304. In other words, the jounce bumper 902 is captured (e.g., positioned between) the tapered portion 916 and the rod guide 920. The rod guide 920 of the illustrate example attaches to the housing 904 to cover and/or seal the cavity 302 and the reservoir 304. In some examples, the jounce bumper 902 may include a tapered portion to matably engage the tapered portion 916 when the jounce bumper 902 is positioned in the reservoir 304.

The tapered portion 916 of the outer tube 908 enables the jounce bumper 902 to have larger dimensional characteristics (e.g., a larger diameter) than the dimensional characteristics of the example jounce bumper 212 of FIGS. 1-8. In this manner, the jounce bumper 902 may include a greater surface area to provide an increase reaction force and/or impact force absorption characteristic(s). For example, an outer diameter of the jounce bumper 902 of the illustrated example may be greater than an outer diameter 926 of a non-tapered portion 928 of the outer tube 908 and less than (e.g., slightly less than) an outer diameter 930 of the tapered portion 916. Additionally, or alternatively, the example tapered surface increases a volume of the reservoir 304 compared to a straight walled outer tube (e.g., the outer tube of FIGS. 1-8). Increased volume enables a greater amount of gas in the reservoir, which may provide greater absorption rate provided by the jounce control of the example shock absorber 900.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A shock absorber apparatus comprising:
   an inner tube defining a cavity;
   an outer tube surrounding the inner tube to define a reservoir between the inner tube and the outer tube, the cavity being in fluid communication with the reservoir; and
   a jounce bumper positioned in the reservoir between the inner tube and the outer tube to restrict a piston in the inner tube to move less than a full compression stroke, the jounce bumper retained in the reservoir via friction provided by an inner surface of the outer tube and an outer surface of the inner tube.

2. The apparatus of claim 1, wherein the jounce bumper has a cylindrical body.

3. The apparatus of claim 1, wherein the jounce bumper is to compress to manage forces by absorbing energy during the compression stroke of the shock absorber.

4. The apparatus of claim 3, wherein the jounce bumper is to compress in a direction parallel to a longitudinal axis of the inner tube.

5. The apparatus of claim 1, further including a rod guide coupled to the outer tube, the jounce bumper having a first end and a second end opposite the first end, the first end of the jounce bumper to engage the rod guide when the jounce bumper is positioned reservoir.

6. The apparatus of claim 5, wherein the jounce bumper is to collapse in a direction toward the rod guide during the compression stroke of the shock absorber.

7. The apparatus of claim 1, wherein the outer tube defines a length between a first end and a second end opposite the first end, the outer tube including a tapered surface positioned along a portion of the length, the tapered surface forming a seat to retain the jounce bumper in the reservoir.

8. The apparatus of claim 7, wherein the jounce bumper is captured in the reservoir between a rod guide and the tapered surface.

9. The apparatus of claim 1, wherein at least one of the inner tube or the outer tube includes a protrusion to maintain a position of the jounce bumper in the reservoir.

10. The apparatus of claim 1, wherein the outer tube of the shock absorber includes an indentation formed on an outer surface of the outer tube to provide a protrusion extending from the inner surface of the outer tube toward the outer surface of the inner tube, the protrusion to engage the jounce bumper to maintain a position of the jounce bumper in the reservoir.

11. The apparatus of claim 1, wherein the inner surface of the outer tube defining the reservoir includes an annular rib to support the jounce bumper when the jounce bumper is positioned in the reservoir.

12. The apparatus of claim 1, wherein the jounce bumper has an outer surface to engage the inner surface of the outer tube and an inner surface to engage the outer surface of the inner tube.

13. The apparatus of claim 1, wherein the jounce bumper is a cylindrical body having an outer diameter defining an outer surface of the jounce bumper and an inner diameter defining an inner surface of the jounce bumper, the outer diameter of the jounce bumper being smaller relative to an inner diameter of the outer tube and the inner diameter of the jounce bumper being larger relative to an outer diameter of the inner tube.

14. A shock absorber apparatus comprising:
   a first tube defining a cavity to receive hydraulic fluid;
   a second tube coupled to and surrounding the first tube to define a reservoir in fluid communication with the cavity, the reservoir between the first tube and the second tube;
   a piston movably coupled to the first tube via a rod extending in the first tube, the piston to move between a first position adjacent a first end of the first tube and a second position adjacent a second end of the first tube opposite the first end along a longitudinal axis of the first tube;
   a valve to control hydraulic fluid flow between the cavity and the reservoir;
   a rod guide coupled to the first end of the first tube, the rod guide to guide the rod relative to the longitudinal axis of the first tube when the piston moves between the first position and the second position; and
   a first jounce bumper positioned in the reservoir between the first tube and the second tube, the first jounce bumper to collapse in a direction substantially parallel relative to the longitudinal axis of the first tube to dampen a force imparted to the shock absorber to restrict an abrupt bottoming-out of at least one of a suspension of a vehicle or the shock absorber under full compression, the first jounce bumper retained in the reservoir via friction provided by an inner surface of the second tube and an outer surface of the first tube.

15. The apparatus of claim 14, further including a gas provided in the reservoir between the first jounce bumper and the hydraulic fluid.

16. The apparatus of claim 14, further including a shoulder formed on an inner surface of the second tube to retain the first jounce bumper in the reservoir.

17. The apparatus of claim 14, wherein the first jounce bumper is a cylinder composed of a urethan material.

18. The apparatus of claim 14, further including a second jounce bumper positioned externally relative to the first tube and the second tube.

19. A method comprising:
   providing a twin-tube shock absorber having a pressure tube defining an inner cavity to hold hydraulic fluid and an outer tube surrounding the pressure tube, the outer tube defining a reservoir fluidly coupled to the cavity, the reservoir to receive hydraulic fluid when a piston moves in a compression direction; and
   coupling a jounce bumper in the reservoir between a rod guide and the hydraulic fluid in the reservoir via a friction fit, the jounce bumper being collapsible in the reservoir tube to dampen a force imparted to the shock absorber by restricting the piston from moving past a maximum compression stroke position in the compression direction, the maximum compression stroke position being less than a full compression stroke position of the shock absorber, the jounce bumper retained in the reservoir via friction provided by an inner surface of the outer tube and an outer surface of the pressure tube.

20. The method of claim 19, further including forming a protrusion in the outer tube to retain the jounce bumper.

\* \* \* \* \*